United States Patent
Jacinto (10) Patent No.: US 8,444,168 B2
(45) Date of Patent: May 21, 2013

(54) CONFIGURATION OF AN ELECTRO-MECHANICAL FIFTH WHEEL LOCK CONTROL UNIT (LOCK CONTROLLER)

(75) Inventor: Jose Aldo Jacinto, Blumenau (BR)

(73) Assignee: Maxilock Industria E Comercio Ltda (BR)

( * ) Notice: Subject to any disclaimer, the term of this patent is extended or adjusted under 35 U.S.C. 154(b) by 76 days.

(21) Appl. No.: 13/124,378

(22) PCT Filed: Jan. 30, 2009

(86) PCT No.: PCT/BR2009/000026
§ 371 (c)(1),
(2), (4) Date: Apr. 14, 2011

(87) PCT Pub. No.: WO2010/043006
PCT Pub. Date: Apr. 22, 2010

(65) Prior Publication Data
US 2011/0304123 A1    Dec. 15, 2011

(30) Foreign Application Priority Data
Oct. 15, 2008  (BR) .................................... 0804064

(51) Int. Cl.
*B60D 1/60* (2006.01)
*B62D 53/10* (2006.01)

(52) U.S. Cl.
USPC ........... 280/507; 280/433; 280/434; 280/436; 280/508; 280/477

(58) Field of Classification Search
USPC .................. 280/507, 433, 434, 436, 508, 477
See application file for complete search history.

(56) References Cited

U.S. PATENT DOCUMENTS

| | | | |
|---|---|---|---|
| 6,272,949 B1 * | 8/2001 | Jarvis et al. ..................... | 74/569 |
| 2005/0121921 A1 | 6/2005 | Alguera et al. | |
| 2006/0290099 A1 | 12/2006 | Buttner | |

FOREIGN PATENT DOCUMENTS

BR        0506248-9 A        8/2007

OTHER PUBLICATIONS

International Search Report issued Jul. 10, 2009 for Application No. PCT/BR2009/000026.

* cited by examiner

*Primary Examiner* — Tashiana Adams
*Assistant Examiner* — Marlon Arce
(74) *Attorney, Agent, or Firm* — Cantor Colburn LLP (57) ABSTRACT

Invention patent application for one Lock Controller (1) made in a cast casing fitted with a closure lid (2) designed with a bearing for the solenoid (3) guiding axle (3*a*) and one microprocessed control unit (4), being said Lock Controller (1) installed in the free niche (C) of the bottom half of the fifth wheel (5) where the hole (5*b*) is made through the wall (5*c*) in order to allow the passage of the extension (1*d*) of the Lock Controller (1) and one hole (6*a*) made into the Locking bar (6) face coinciding with the wall (5*c*) limits the course and one safety ring (8) is welded or glued at section (7*a*) of the long rod (7), to limit its course.

4 Claims, 10 Drawing Sheets

Detail A

Figure 21

Detail B

CONFIGURATION OF AN ELECTRO-MECHANICAL FIFTH WHEEL LOCK CONTROL UNIT (LOCK CONTROLLER)

TECHNICAL FIELD

The present invention patent application describes an electro mechanical fifth wheel lock control unit (Lock controller), having improved state-of-the-art design and arrangement, to be applied on highway trucks, particularly tractor trucks fitted with fifth Wheel.

BACKGROUND

The existing patent #P1 9901143-3 from this same applicant describes a Lock 10 Controller that goes installed inside the bottom half of a truck tractor fifth wheel, designed to prevent the semi-trailer from being disengaged from the truck tractor without authorization, fitted with an electro-mechanical circuit including a solenoid impulse device that moves a locking pin in and out of the fifth-wheel kingpin locking bar, being that its actuation is controlled by a portable electronic signal device that 15 is connected to the Lock Controller by means of an input connector.

BRIEF SUMMARY

Figure 18:
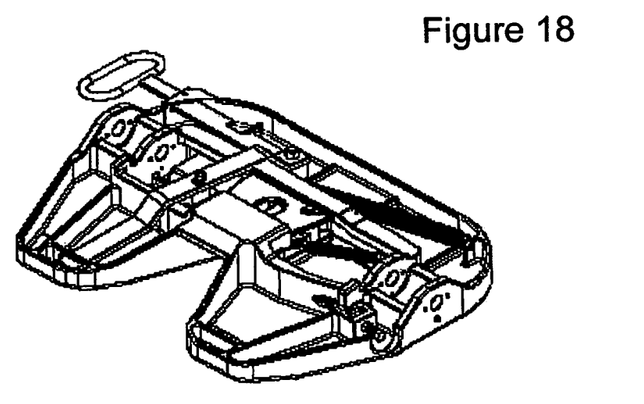
FIG. 18 is a perspective right-hand front top view of the bottom half of the fifth wheel with the Lock Controller.
Figure 19:
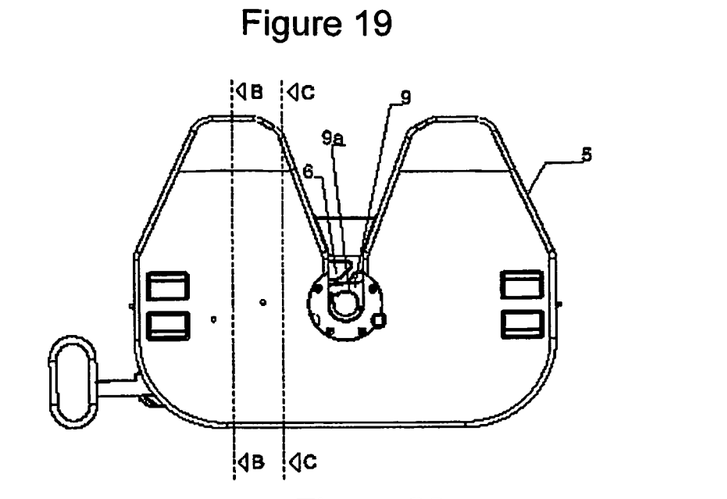
FIG. 19 is a top view of the bottom half of the fifth wheel showing the absence of changes with the installation of the Lock Controller.

The reason for the present improvement application is because the patented Controller goes installed outside the locking bar sliding channel (See FIG. 18-A) adjacent to it (See FIG. 18-B), and requires the locking bar actuation lever to be 20 disassembled and adapted to the Controller design, thus requiring technical labor and too much down time for the disassembly and re-assembly of the fifth wheel. Another reason is because the patented Controller (See FIG. 18-B) can be easily reached, what leaves it too exposed to violation attempts.

Figure 1:
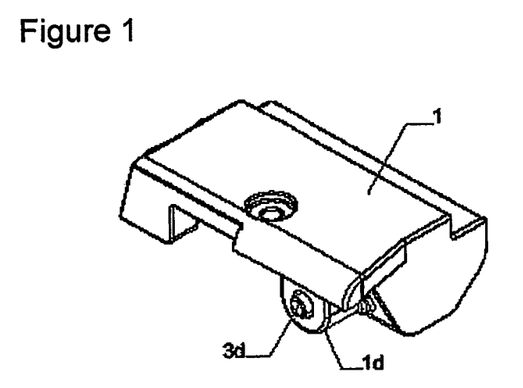
FIG. 1 is a perspective right-hand front view of the Lock Controller alone.
Figure 2:
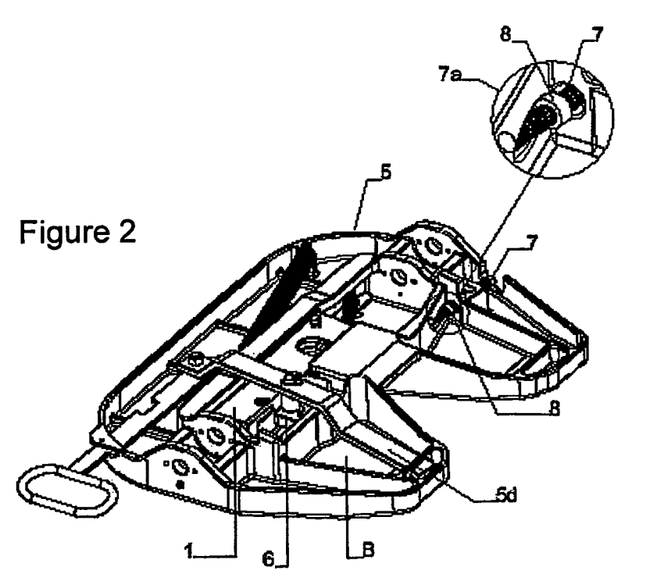
FIG. 2 is a perspective left-hand front view of the bottom half of a fifth wheel with the Lock Controller installed in it.
Figure 3:
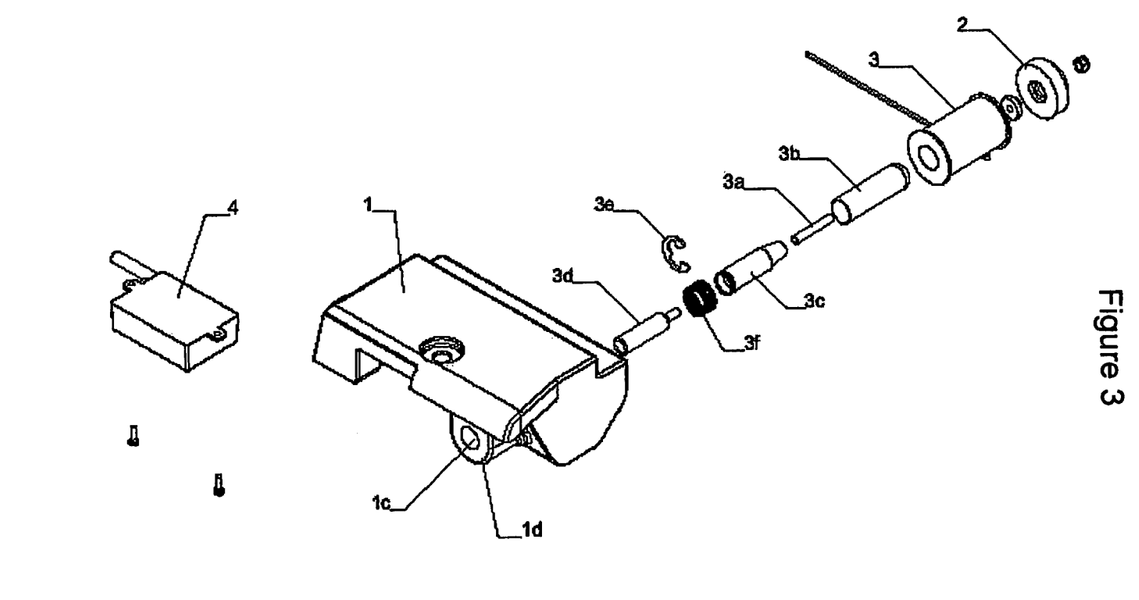
FIG. 3 is a perspective right-hand front exploded view of the Lock Controller alone.
Figure 4:
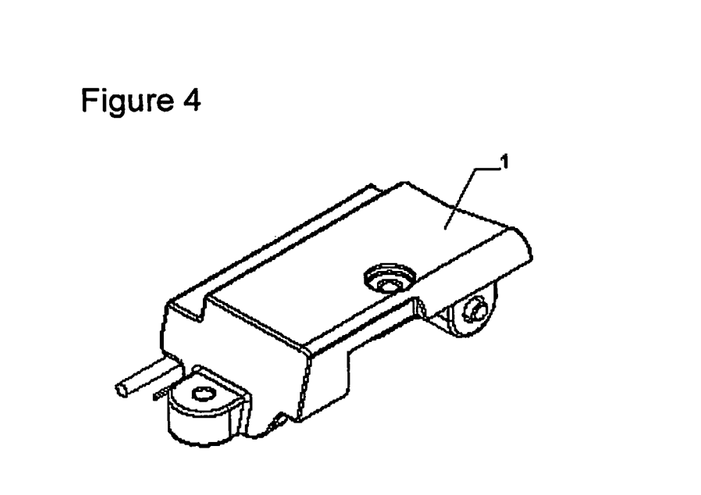
FIG. 4 is a perspective left-hand front view of the Lock Controller alone.
Figure 5:
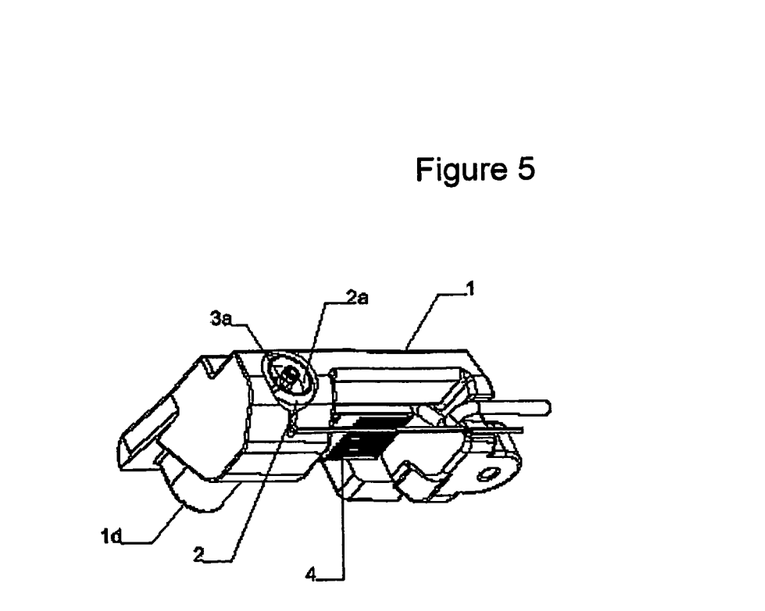
FIG. 5 is a perspective rear bottom view of the Lock Controller alone.
Figure 6:
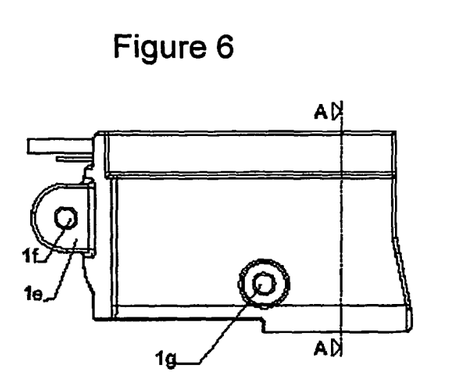
FIG. 6 is a top view of the Lock Controller alone.
Figure 7:
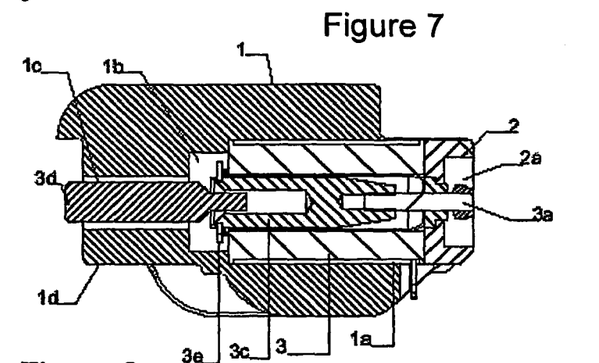
FIG. 7 is a lateral AA-section view—FIG. 6 of the Lock Controller alone.
Figure 8:
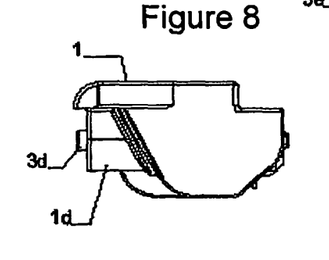
FIGS. 8 and 9 are respectively right-hand and left-hand views of the Lock Controller alone.
Figure 9:
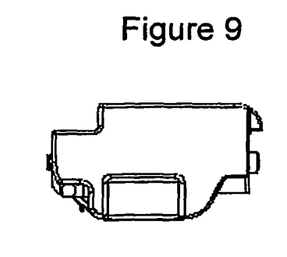
Figure 10:
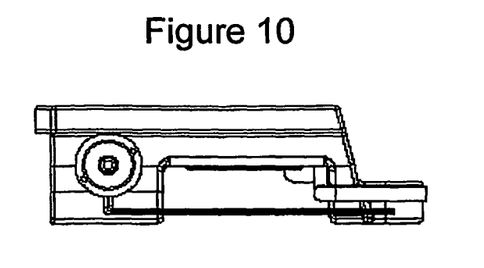
FIGS. 10, 11 and 12 are respectively rear, front and bottom views of the Lock Controller alone.
Figure 11:
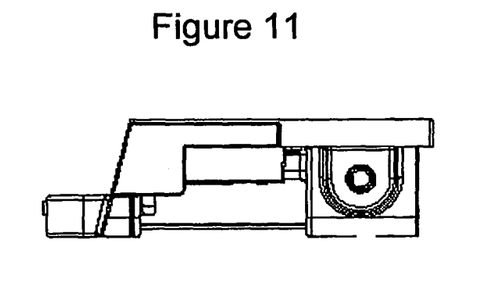
Figure 12:
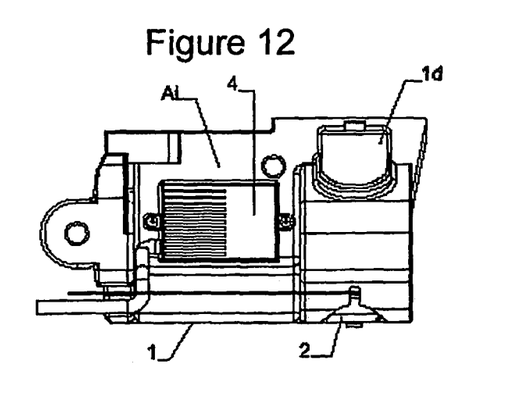
Figure 13:
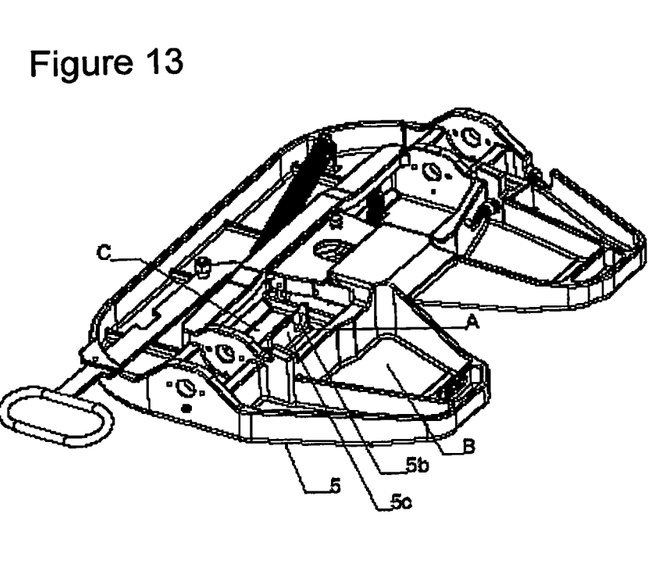
FIG. 13 is a perspective left-hand front view of the bottom half of the fifth wheel without the Lock Controller and without the locking bar and its control bar.
Figure 14:
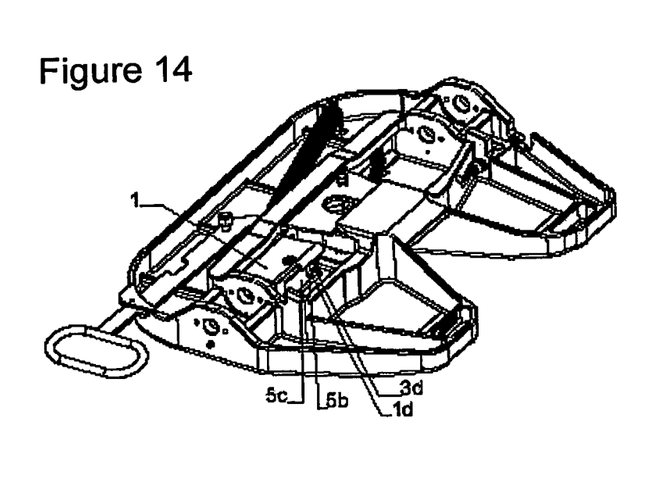
FIG. 14 is a perspective left-hand front view of the bottom half of the fifth wheel with the Lock Controller and without the locking bar and its control bar.
Figure 15:
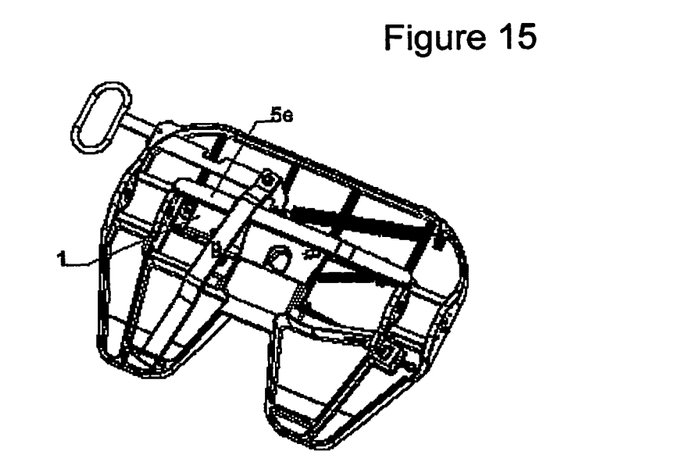
FIGS. 15 and 16 are perspective top views of the bottom half of the fifth wheel with the Lock Controller, respectively, with and without the locking bar and its control bar.
Figure 16:
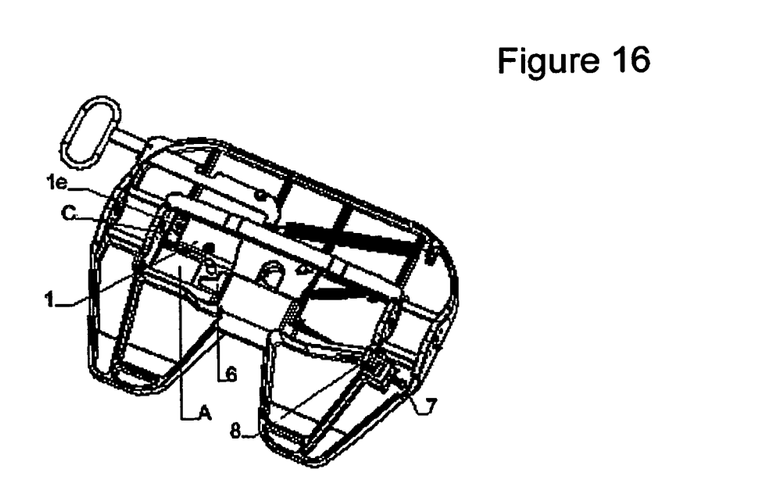
Figure 17:
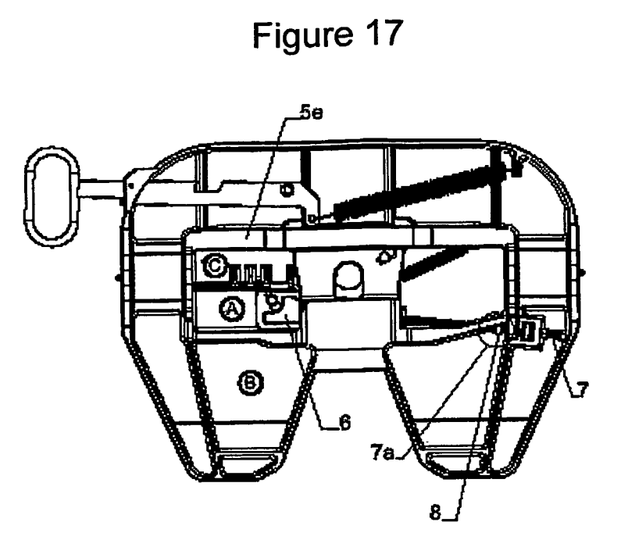
FIG. 17 is a top view of the bottom half of the fifth wheel without the Lock Controller and without the locking bar and its control bar, showing the niche where the Lock Controller is positioned.

Therefore, as an improvement to the already patented Lock Controller, the applicant is hereby applying for the invention patent of an "IMPROVED CONFIGURATION OF AN ELECTRO-MECHANICAL FIFTH WHEEL LOCK CONTROL UNIT (LOCK CONTROLLER)", which in short comprises a cast structure shaped in a trapezoidal design as to fit into the free niche of the fifth wheel (See FIG. 17-C), parallel to the locking bar sliding channel (See FIG. 17-A). The Lock Controller includes a cast cylinder that is milled as to house the solenoid actuator, which locking pin moves through a hole made at the partition wall between the free niche and the locking bar sliding channel as to prevent the locking bar from sliding, but leaving it with a minimum sliding space to compensate any wearing of the locking bar end. An electronic module is fitted at the bottom of the Lock Controller and a safety ring is either welded or glued to the locking bar position adjustment rod as to prevent it from being fully removed or threaded any further with the purpose of forcing the locking bar in order to break the solenoid locking pin.

Electro-mechanical device fitted with an intelligent control center (Electronic starter or switch), operated by means of remote signal that can be any communication wave signal to start an electro-mechanical device like a solenoid actuator or electric motor, which when OFF remains locked in a NC (Normally closed) position, thus preventing the fifth wheel locking bar from disengaging the semi-trailer kingpin.

The model the present invention patent is being applied for has unique features that are capable of distinguishing it from the state-of-the-art, including both practical and functional improvements, thus gathering enough conditions to deserve the applied protection.

BRIEF DESCRIPTION OF THE DRAWINGS

From this point on, the model will be described in details, including figure numbers associated with the description, whereby.

DETAILED DESCRIPTION

According to these figures, the Lock Controller (1) includes a cast casing shaped in a rectangular trapezoidal profile, composed of a milled cylinder (1a) that ends up in a chamber (1b), which cuts out the intermediate extension (1d) between the front orifice (1c) and the lid (2), with a recessed design (2a), designed to close the chamber (1b) and bearing (3a) for the solenoid actuating pin (3), which comprises a heat-sinking tube (3b) designed to sink the heat produced by the solenoid (3), being the solenoid actuator pin (3a) coupled to the bearing axle (3c) having a symmetric outer diameter while the inner diameter of the heat-sinking pipe (3b) works as an axel and bearing for the solenoid actuating pin (3a) and also for the locking pin (3d); the locking ring (3e) fixes the spring (3f) inside the chamber (1b) where it limits the course of the Locking pin (3d). The Lock Controller (1) describes a bottom opening (Ai) that houses the micro-processed control unit (4). One foot (1e) with a hole (1f) and a secondary hole (1g) is available on the Lock Controller (1) in order to fasten it to the bottom of the free niche (C) of the bottom half of the fifth wheel (5).

Figure 20:
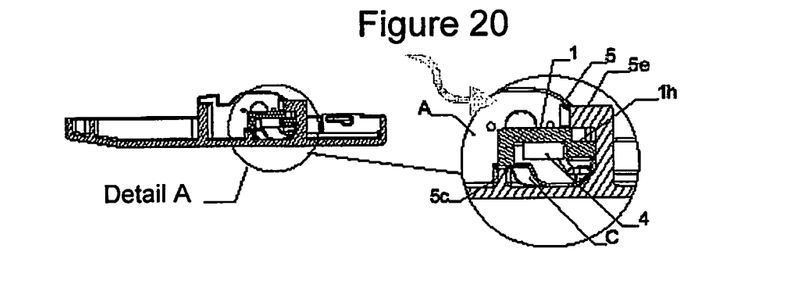
FIG. 20 is a lateral sectional B-B view of FIG. 19 showing the bottom half of the fifth wheel and the Lock Controller fitted in the niche, with an enhanced view of the B-detail.
Figure 21:
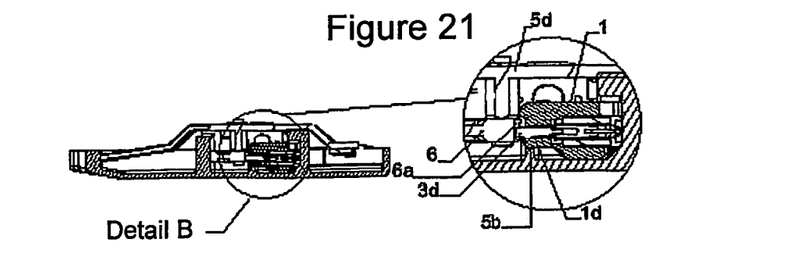
FIG. 21 is a lateral sectional view of CC-section of FIG. 19 showing the bottom half of the fifth wheel and the Lock Controller fitted in the niche and its position regarding the locking bar, with an enhanced view of the B-detail.
Figure 22:
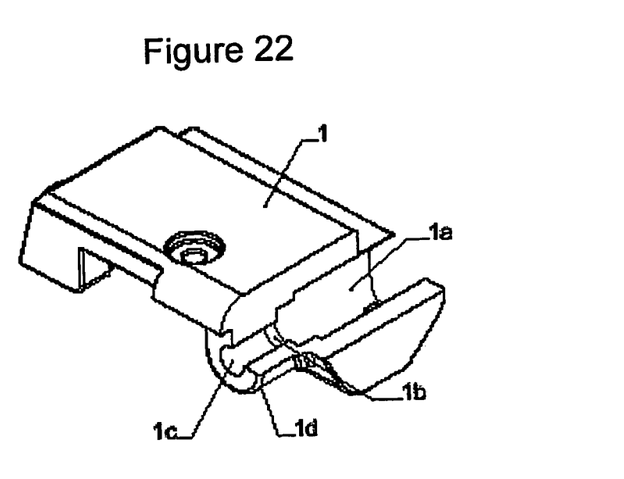
FIG. 22 is a perspective right-hand front view of the Lock Controller, showing a partial section of the cylinder, chamber and orifice.
Figure 23:
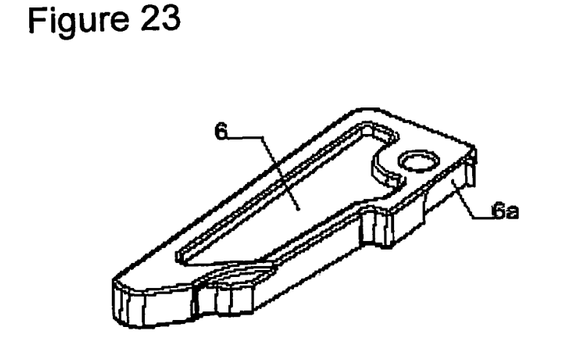
FIG. 23 is a perspective view of the locking bar alone, showing the hole made to fit the solenoid locking pin.

The installation (FIGS. 2, 14, 15, 16, 18, 20 and 21) of the Lock Controller (1) in the bottom half of the fifth Wheel is executed by inserting (See FIG. 20) the step (1h) of the Lock Controller (1) down into the free niche (C), parallel to the locking bar (6) sliding channel (A) until it's rear surface stops against the bottom and the step (1h) rests under the cross beam (5e), being that a hole (5b) is made through the partition wall between the free niche (c) and the channel (A), as to allow for the insertion of the Lock Controller (1) extension (1d), which positioning is obtained by removing the actuating lever (5d) of the locking bar (6), which is also removed to make a hole (6a) in it's side face coinciding with the wall (5c), leaving a minimum space for the locking bar (6) do move, since the wearing (9a) of the kingpin seat in the kingpin tracer (9) needs periodic adjustment of the long rod (7) and, in order to prevent the long rod from being fully removed or threaded against the locking bar (6) in an attempt to break the locking pin (3d), there is a safety ring (8) that is either welded or glued to the section (7a) of the long rod (7).

The improvements made to the present model are remarkable, including with regards to the technique used and known from the patent PI 9901143-3 of this same applicant.

The invention claimed is:

1. Improved configuration of an electro-mechanical fifth wheel lock control unit comprising:
   a Lock Controller fitted with a closure lid having a solenoid guiding axle bearing and one micro-processed control unit, said Lock Controller being installed in a free niche of a bottom half of a fifth wheel;
   wherein the Lock Controller is made in a cast casing shaped in a rectangular trapezoidal profile, containing one milled cylinder that ends up in a chamber that cuts out an intermediate extension between a front orifice and the lid, with a recessed design, designed to close the chamber and the solenoid guiding axle bearing that comprises a heat-sinking tube designed to sink the heat produced by the solenoid guiding axle bearing coupled to a bearing axle having an outer diameter symmetric to an inner diameter of the heat-sinking tube working as the solenoid guiding axle bearing and also of a locking pin and a locking ring holds a spring inside the chamber limiting a course of the locking pin;
   wherein a bottom opening houses the micro-processed control unit and one foot having a first hole and a second hole are available on the Lock Controller that is installed in the free niche of the bottom half of a fifth Wheel where a third hole is made through a wall to allow the passage of an extension and a fourth hole made at a locking bar at the face coinciding with the wall limits the course of the locking pin and a safety ring is either welded or glued to a section of a long rod.

2. Lock control unit according to claim 1, wherein the rectangular trapezoidal profile of the Lock Controller makes it easier to insert the Lock Controller down into the free niche until a rear surface stops against the bottom and the step rests under the cross beam and the extension fits into the hole made into the wall.

3. Lock control unit according to claim 1, wherein the installation of the Lock Controller in the bottom half of the fifth Wheel is carried out by dismounting and removing an actuating lever of the locking bar and making the fourth hole into the Locking bar at a side thereof that coincides with the wall.

4. Lock control unit according to claim 1, wherein the welding or gluing of the safety ring at a section of the long rod limits the course of the long rod to the length of the section and prevents the long rod from being entirely removed or threaded ahead.

* * * * *